US012586450B2

(12) United States Patent
Volkerink et al.

(10) Patent No.: US 12,586,450 B2
(45) Date of Patent: Mar. 24, 2026

(54) LINE-POWERED WIRELESS COMMUNICATIONS SYSTEMS

(71) Applicant: Trackonomy Systems, Inc., San Jose, CA (US)

(72) Inventors: Hendrik J Volkerink, Palo Alto, CA (US); Ajay Khoche, West San Jose, CA (US)

( * ) Notice: Subject to any disclaimer, the term of this patent is extended or adjusted under 35 U.S.C. 154(b) by 0 days.

(21) Appl. No.: 18/776,123

(22) Filed: Jul. 17, 2024

(65) Prior Publication Data

US 2025/0087068 A1 Mar. 13, 2025

Related U.S. Application Data

(63) Continuation of application No. 18/094,317, filed on Jan. 6, 2023, now Pat. No. 12,067,443, which is a continuation of application No. 16/923,060, filed on Jul. 7, 2020, now Pat. No. 11,580,826.

(60) Provisional application No. 62/871,685, filed on Jul. 8, 2019.

(51) Int. Cl.
| | |
|---|---|
| *G08B 5/36* | (2006.01) |
| *G06K 7/10* | (2006.01) |
| *G08B 3/00* | (2006.01) |
| *G16Y 40/00* | (2020.01) |
| *H04W 84/18* | (2009.01) |

(52) U.S. Cl.
CPC ........... *G08B 5/36* (2013.01); *G06K 7/10217* (2013.01); *G08B 3/00* (2013.01); *G16Y 40/00* (2020.01); *H04W 84/18* (2013.01)

(58) Field of Classification Search
CPC .................................................. G06K 7/10217
USPC ........................................................ 235/451
See application file for complete search history.

(56) References Cited

U.S. PATENT DOCUMENTS

| | | | | |
|---|---|---|---|---|
| 9,305,283 B1* | 4/2016 | Lauka | ................. | G06K 7/10237 |
| 2002/0167406 A1* | 11/2002 | Garber | ..................... | H01Q 7/00 |
| | | | | 340/572.1 |
| 2006/0081713 A1* | 4/2006 | Carrender | ................ | G06K 1/18 |
| | | | | 235/462.46 |
| 2006/0187041 A1* | 8/2006 | Olsen, III | ............. | B65B 11/045 |
| | | | | 700/215 |
| 2010/0294840 A1* | 11/2010 | Barry | .................... | B01L 3/5453 |
| | | | | 235/462.01 |
| 2011/0298301 A1* | 12/2011 | Wong | ..................... | G01D 4/004 |
| | | | | 702/62 |
| 2020/0034583 A1* | 1/2020 | Nikitin | ............... | G06K 7/10128 |
| 2021/0191341 A1* | 6/2021 | Subbloie | ................. | H02H 7/20 |
| 2022/0318842 A1* | 10/2022 | Rengarajan | .......... | G07F 15/005 |

* cited by examiner

*Primary Examiner* — Allyson N Trail

(57) ABSTRACT

Embodiments disclosed herein generally relate to line-powered wireless communications systems, and more specifically to methods and apparatus for providing persistent and ubiquitous wireless communications and sensor networks in physical premises to enable a wide variety of different applications and use cases.

20 Claims, 13 Drawing Sheets

Physical Premises  98

Physical Premises  98

FIG. 8A                               FIG. 8B

Physical Premises Environment
258

Smart Light Bulb

Smart Light Socket

Standard Light Bulb

Microphone & Loudspeaker

Multi-colored e.g.: Red Green Yellow

LINE-POWERED WIRELESS COMMUNICATIONS SYSTEMS

CROSS-REFERENCE TO RELATED APPLICATION

This application is a continuation of U.S. patent application Ser. No. 18/094,317, filed Jan. 6, 2023, which itself is a continuation of U.S. patent application Ser. No. 16/923, 060, filed Jul. 7, 2020, now U.S. Pat. No. 11,580,826, which claims priority to U.S. Provisional Patent Application No. 62/871,685, filed Jul. 8, 2019, all of which are incorporated by reference herein in their entirety.

BACKGROUND

Embodiments disclosed herein generally relate to line-powered wireless communications systems, and more specifically to methods and apparatus for providing persistent and ubiquitous wireless communications and sensor networks in physical premises to enable a wide variety of different applications and use cases.

SUMMARY

The invention features methods, apparatus operable to implement the methods described herein, and computer-readable media storing computer-readable instructions causing a computer to implement the methods described herein.

DESCRIPTION OF DRAWINGS

FIG. 8A is a diagrammatic side view of an example light bulb and an adapter that incorporates an example line-powered wireless communications system.

FIG. 8B is a diagrammatic exploded side view of the light bulb adapter shown in FIG. 8A.

DETAILED DESCRIPTION

Introduction

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof.

The term "metadata" include information about data objects or characteristics thereof.

The terms "module," "manager," and "unit" refer to hardware, software, or firmware, or a combination thereof.

Exemplary Embodiments

Figure 1:
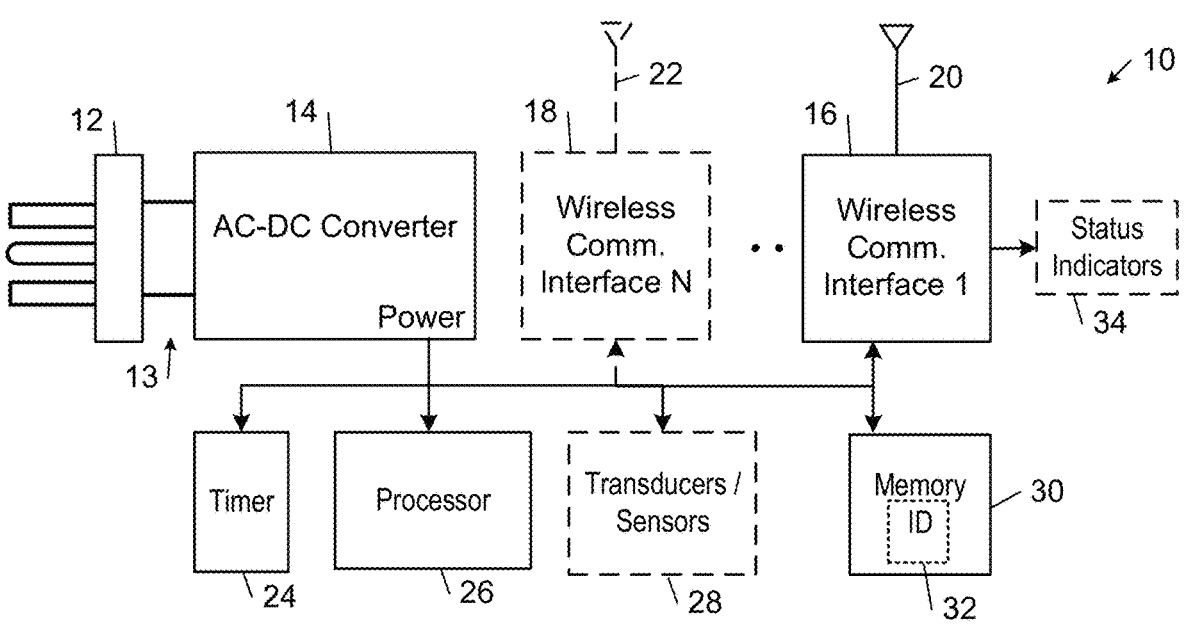
FIG. 1 is a block diagram of an embodiment of a line-powered wireless communications system.

FIG. 1 shows a block diagram of an embodiment of a line-powered wireless communications system 10. The system 10 includes a wall power plug 12 that is enclosed within a protective casing. In the illustrated embodiment, the wall power plug has a three-prong configuration. In other embodiments, the wall power plug may have any of a wide variety of plug styles, including two-prong configurations of live and neutral prongs. In the illustrated example, the prongs of the wall power plug 12 can be plugged into an electrical outlet or socket to carry an alternating current over live and neutral connections 13 to the input of an alternating current/direct current (AC/DC) converter 14, which supplies direct current to power the other electrical components of the wireless communications system 10. In some examples, the wireless communications system 10 also includes a voltage regulator (not shown) that automatically maintains a constant input voltage level.

The wireless communications system 10 also includes a wireless communications interface 16 and zero or more other wireless communications interfaces 18, each of which typically includes a respective antenna 20, 22. In addition, the wireless communications system 10 includes a timer circuit 24, a processor or microcontroller unit 26, one or more transducers and sensors 28, a memory module 30 that stores a device identifier (ID) 32 that identifiers the wireless communications system 10, and one or more status indicators 34. In some examples, the wireless communications system includes a rechargeable backup battery that is configured to supply direct current energy to the system when line power is unavailable. In general, the internal components of wireless communications system 10 may be configured in a variety of different ways. For example, the components may be arranged on one or more circuit substrates (e.g., printed circuit boards) in any suitable configuration that meets specified size, form factor, and performance constraints.

The instant specification describes an example system of wireless communications devices that can be used to implement a low-cost wireless network infrastructure for performing monitoring, tracking, and other industrial internet-of-things (IOT) functions relating to, for example, parcels, persons, tools, equipment and other physical assets and objects. In one example, the system includes a set of three different types of wireless communications devices that have different respective functionalities and optionally different respective cover markings that visually distinguish the different wireless communications device types from one another. In one non-limiting example, the covers of the different wireless communications device types are marked with different colors (e.g., white, green, and black). In the illustrated examples, the different wireless communications device types are distinguishable from one another by their respective wireless communications capabilities and their respective sensing capabilities.

Figure 2A:
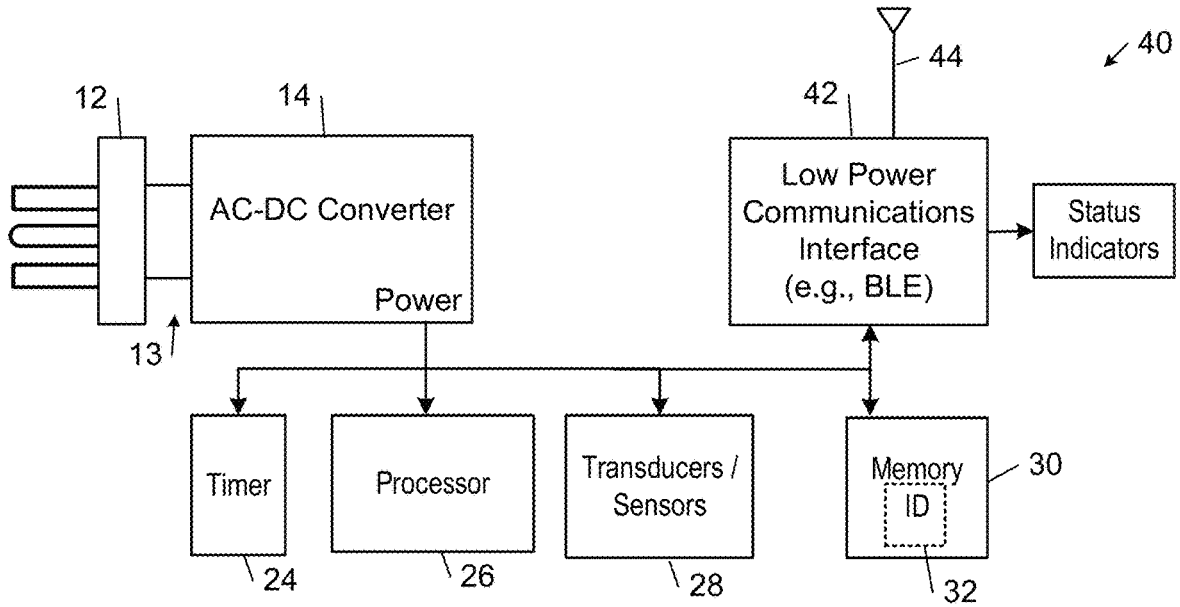
FIG. 2A is a block diagram of an embodiment of a line-powered wireless communications system.

FIG. 2A shows an example wireless communications device 40 that includes a respective set of components corresponding to the first wireless communications device type (i.e., white). In this example, the wireless communications device 40 includes one or more printed circuit boards (not shown) that include one or more wiring layers that connect the timer circuit 24, the processor 26, a low power wireless communication interface module 42 (e.g., a Bluetooth® Low Energy (BLE) communications interface, a Zigbee communications interface, or a Z-Wave communications interface), one or more transducing or sensing components 28, the memory 30, and other components to the output of the AC-DC converter component 14 and, thereby, enable the transducing, sensing, tracking, communicating, and other functionalities of the wireless communications device 40. The low power wireless communication interface module 42 typically is electrically connected to an antenna 44. In the illustrated example, the wireless communications device 40 also includes visible status indicators 46 on the external casing of the wireless communications device 40. In one embodiment, the status indicators include a set of three lights (e.g., red, yellow, and green) that correspond to respective states of the wireless communications device 40. In an example, a red light indicates an actual or imminent system failure state, a yellow light indicates a warning state, and a green light indicates a normal operating state.

Figure 2B:
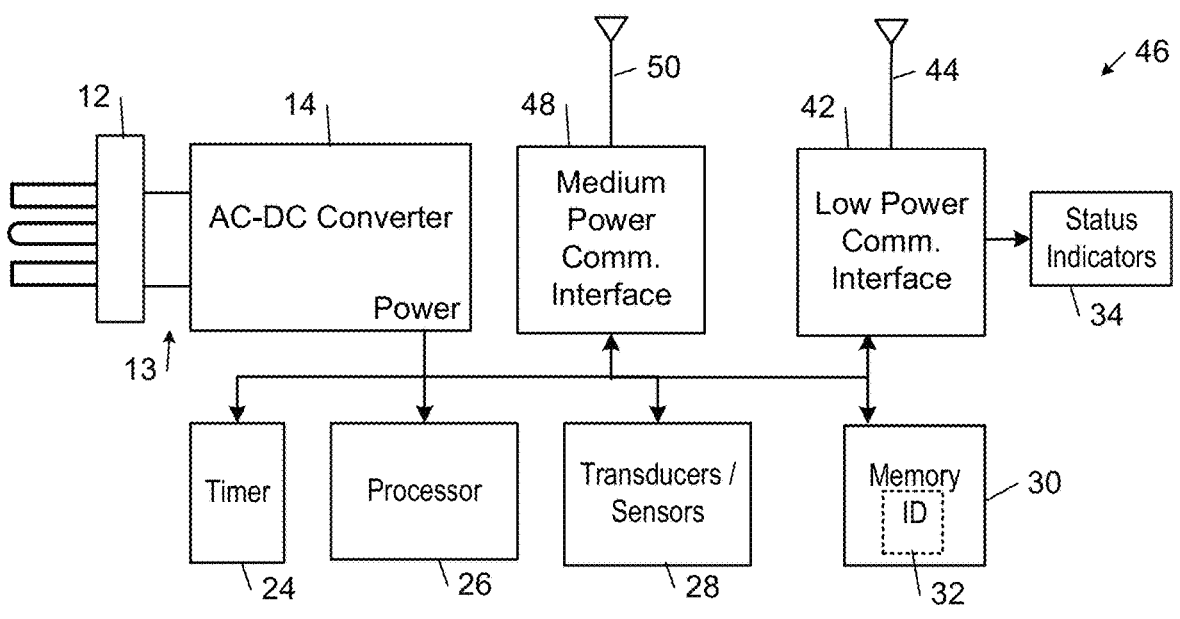
FIG. 2B is a block diagram of an embodiment of a line-powered wireless communications system.

FIG. 2B shows an example wireless communications device 46 that includes a respective set of components corresponding to the second wireless communications device type (i.e., green). In this example, the wireless communications device 46 includes one or more printed circuit boards (not shown) that include one or more wiring layers that connect the timer circuit 24, the processor 26, a low power wireless communication interface module 42 (e.g., a Bluetooth® Low Energy (BLE) communications interface, a Zigbee communications interface, and a Z-Wave communications interface), a medium power wireless communication interface module 48 (e.g., a LoRaWAN communications interface or a Wi-Fi communications interface), one or more transducing or sensing components 28, the memory 30, and other components to the output of the AC-DC converter component 14 and, thereby, enable the transducing, sensing, tracking, communicating, and other functionalities of the wireless communications device 46. Each of the low and medium power wireless communications interface modules 42, 48 is electrically connected to a respective antenna 44 and 50. In the illustrated example, the wireless communications device 46 also includes visible status indicators on the external casing of the wireless communications device 46. In one embodiment, the status indicators include a set of three lights (e.g., red, yellow, and green light emitting diodes) that correspond to respective states of the wireless communications device 46. In an example, a red light indicates an actual or imminent system failure state, a yellow light indicates a warning state, and a green light indicates a normal operating state.

Figure 2C:
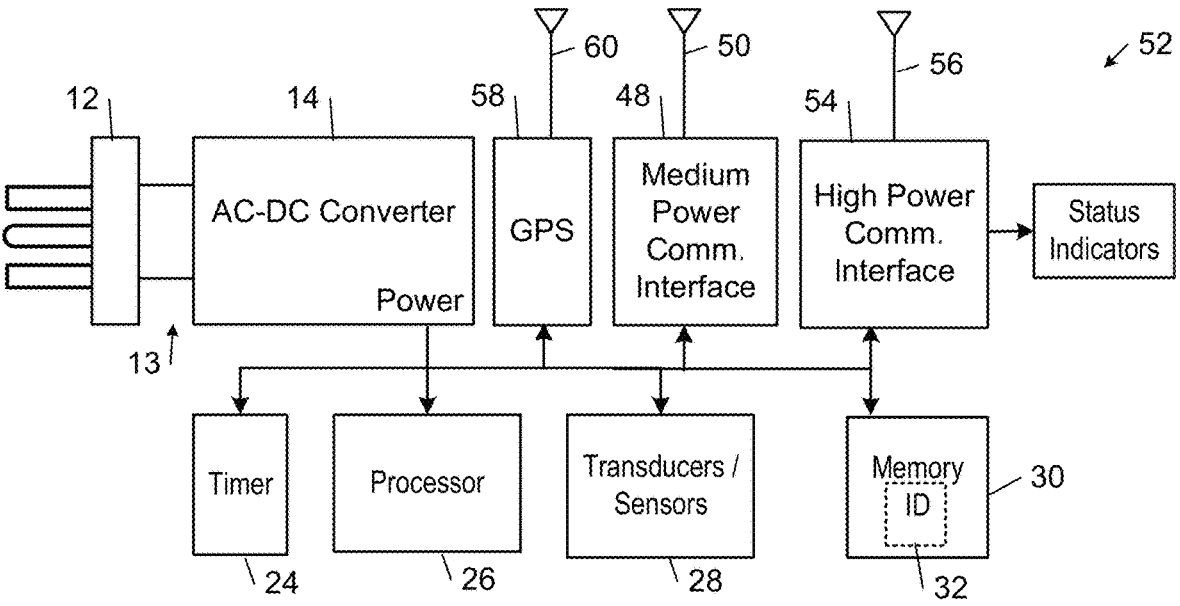
FIG. 2C is a block diagram of an embodiment of a line-powered wireless communications system.

FIG. 2C shows an example wireless communications device 52 that includes a respective set of components corresponding to the third wireless communications device type (i.e., black). In this example, the wireless communications device 52 includes one or more printed circuit boards (not shown) that include one or more wiring layers that connect the timer circuit 24, the processor 26, a medium power wireless communication interface module 48 (e.g., a LoRaWAN communications interface), a high power wireless communication interface module 54 (e.g., a cellular communications interface), one or more transducing or sensing components 28, a memory 30, and other components to the output of the AC-DC converter component 14 and, thereby, enable the transducing, sensing, tracking, communicating, and other functionalities of the wireless communications device 52. Each of the medium and high power wireless communications interface modules 48, 54 is electrically connected to a respective antenna 50 and 56. In the illustrated example, the wireless communications device 52 includes a GPS (Global Positioning System) receiver 58 and antenna 60. The third wireless communications device type 52 also includes visible status indicators on an external casing of the wireless communications device 52. In one embodiment, the status indicators include a set of three lights (e.g., red, yellow, and green light emitting diodes) that correspond to respective states of the wireless communications device 46. In an example, a red light indicates an actual or imminent system failure state, a yellow light indicates a warning state, and a green light indicates a normal operating state.

Examples of the types of transducer and sensors 28 that may be incorporated into the wireless communications system described herein are a capacitive sensor, an altimeter, a gyroscope, an accelerometer, a temperature sensor, a strain sensor, a pressure sensor, a light sensor (e.g., a photodiode or a camera), a sound sensor (e.g., a microphone), a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), and a humidity sensor. Examples of actuating (e.g., energy emitting) transducers include light emitting components (e.g., light emitting diodes and displays), electro-acoustic transducers (e.g., audio speakers), electric motors, and thermal radiators (e.g., an electrical resistor or a thermoelectric cooler).

Figure 3A:
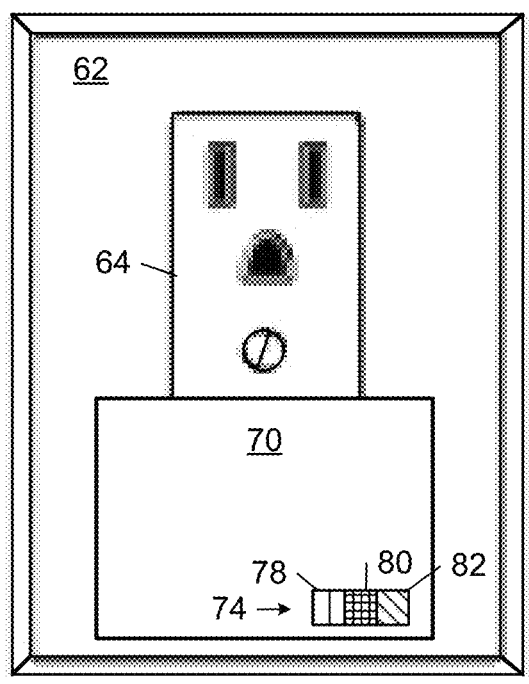
FIG. 3A is a diagrammatic front view of a line-powered wireless communications system plugged into an electrical wall outlet.
Figure 3B:
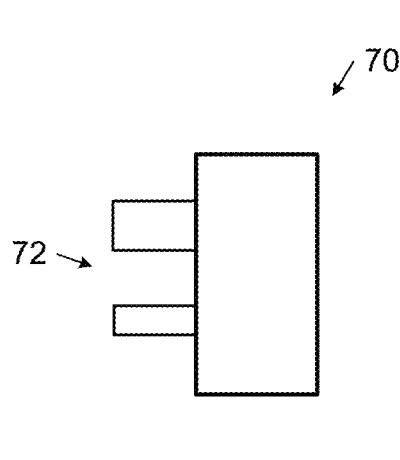
FIG. 3B is a diagrammatic side view of the line-powered wireless communications system shown in FIG. 3A.

Referring to FIGS. 3A and 3B, in general, the wireless communications devices described herein may have any of a wide variety of different form factors. FIG. 3A shows an example faceplate 62 surrounding a conventional electrical socket 64 (also referred to as an electrical outlet) for a three-prong plug. FIG. 3B shows an example wireless communications device 70 that has a three-prong power plug 72 protruding from a back side of the device casing and a light-emitting status indicator 74 on the opposite side of the device casing. In the illustrated example, the casing has a rectangular block form factor. In other embodiments, the casing may have a different shape, such as a rounded or circular shape. In some examples, the status indicator 74 includes a set of three lights that produce different illumination colors. In an embodiment, the status indicator 74 includes a red light 78, a yellow light 80, and a green light 82. In some embodiments, the lights 78, 80, 82 are implemented by light-emitting diodes.

FIG. 3A shows the wireless communications device 70 with the three-pronged power plug 72 inserted into the conventional electrical socket 64 that supplies electrical AC power to the wireless communications device 70. Once the wireless communications device 70 is plugged into an outlet and connected to line power, the wireless communications device 70 is able to perform any of a wide variety of different functions or tasks based on the program instructions stored in memory, including sensing, transducing, and wireless communications functions.

Figure 4A:
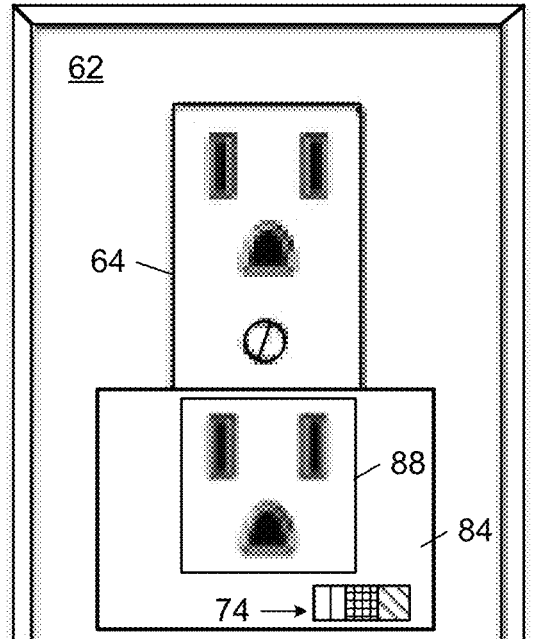
FIG. 4A is a diagrammatic front view of a socket equipped line-powered wireless communications system plugged into an electrical wall outlet.
Figure 4B:
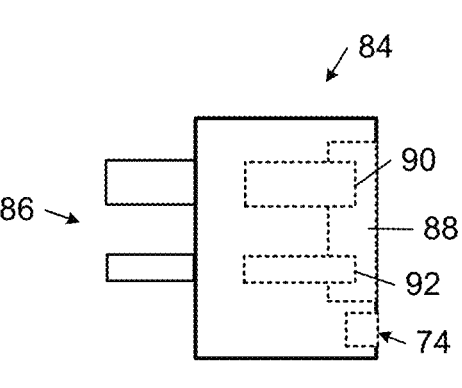
FIG. 4B is a diagrammatic side view of the socket equipped line-powered wireless communications system shown in FIG. 4A.

FIGS. 4A and 4B show another example wireless communications device 84 with a rectangular block form factor. In this example, the wireless communications device 84 has a backside plug 86 that plugs into the conventional electrical socket 64 that supplies AC electrical power to the wireless communications device. The wireless communications device 84 also has a front side socket 88. In this approach, the socket 64 powers both the wireless communications device 84 and the front side socket 88, which includes, for example, a standard three-prong plug interface 90, 92. In this way, wireless communications device 84 provides an electrical pass-through feature that maintains an open socket.

Figures 5A, 5B:
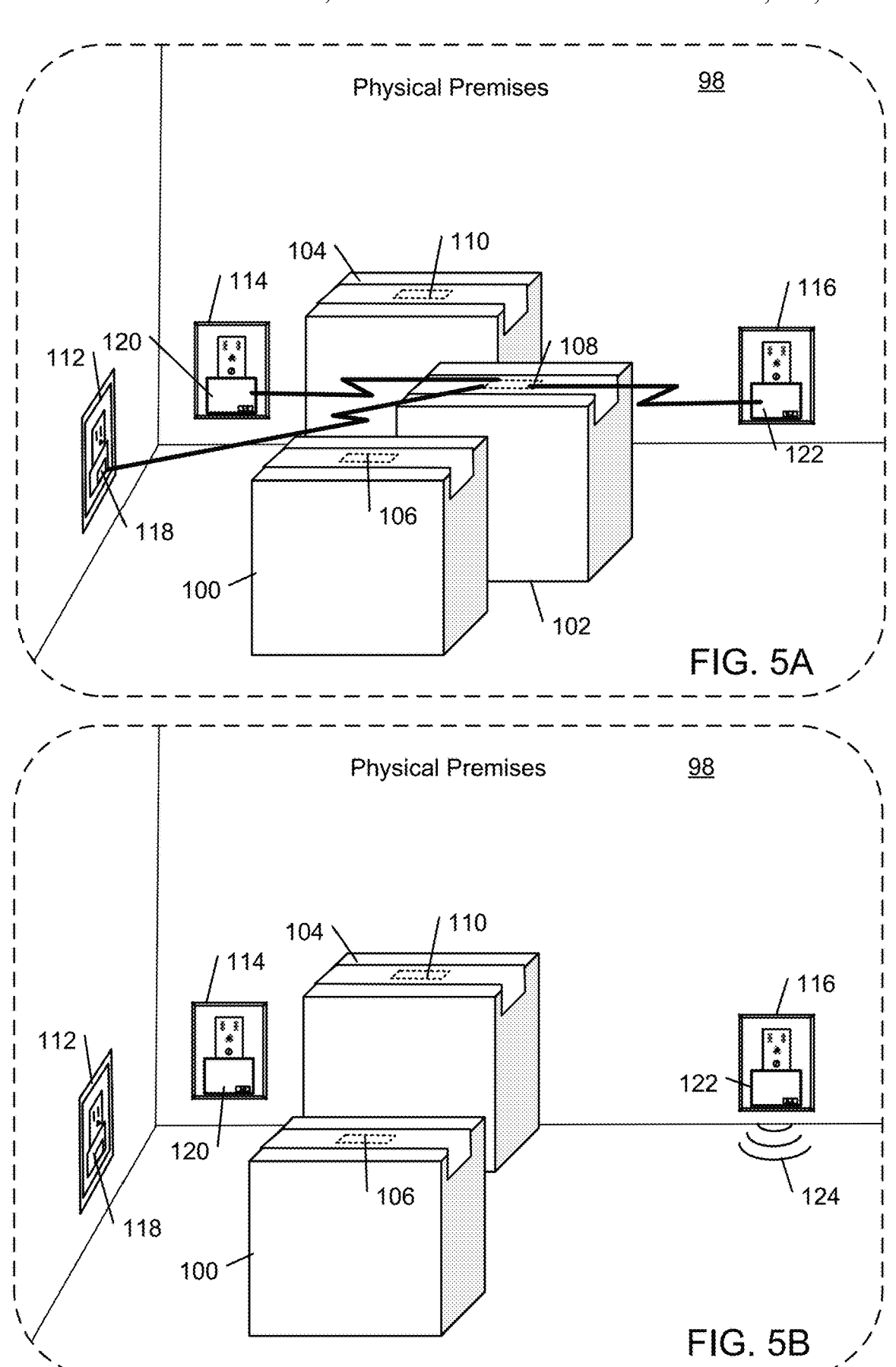
FIG. 5A is a diagrammatic view of an embodiment of a physical premises environment that includes multiple line-powered wireless communications systems operable to cooperatively monitor and track assets.
FIG. 5B is a diagrammatic view of the embodiment of the physical premises environment shown in FIG. 5A in which an alarm is triggered in response to a logistic rule violation.

FIG. 5A shows an example physical premises 98. In general, the physical premises 98 may correspond to any type of enclosed, partially enclosed, or open space. In the illustrated embodiment, the physical premises 98 is an asset storage room that includes a set of assets 100, 102, 104 associated with flexible adhesive wireless communications tags 106, 108, 110. The wireless communications tags 106, 108, 110 may be any type of tag capable of transmitting or otherwise providing, for example, a universally unique identifier or other data. In some embodiments, the tags 106, 108, 110 correspond to the wireless tape nodes described in U.S. Pat. No. 10,262,255. In other embodiments, the tags 106, 108, 110 are passive RFID tags that use energy received from an RFID reader to transmit signals containing data (e.g., a unique identifier associated with the tag), or active RFID tags that have respective power sources for transmitting signals containing data.

In the illustrated embodiment, the physical premises 98 include a set of electrical outlets 112, 114, 116. A respective line-powered wireless communications device 118, 120, 122 is plugged into a respective socket of each outlet 112, 114, 116. In the illustrated embodiment, the line-powered wireless communications devices 118, 120, 122 are of the type shown in FIGS. 3A and 3B. In other embodiments, one or more of the line-powered wireless communications devices 118, 120, 122 may be replaced by one or more of the line-powered wireless communications devices of type shown in FIGS. 4A and 4B.

In some embodiments, the line-powered wireless communications devices 118, 120, 122 are configured with instructions stored in their respective memories to perform asset tracking and preventative logistics. In some examples, the instructions are determined by mapping out a description of a supply chain including parcels (e.g., boxes, pallets, and containers) and feeding that information into a logistics processing system. The logistics processing system compiles the supply chain data to derive respective computer-readable instructions for each of the wireless communication devices in the overall system (e.g., wireless tape nodes and line-powered wireless communications devices, collectively referred to herein as "wireless communications agents"). In some examples, the wireless communications agents act as traffic agents that detect logistic rule violations by performing localized context-sensitive checks between periods in which the wireless communications agents are in sleep mode. In some examples, the wireless communications agents download checks and rule violations that trigger alarms, including supply chain rules regarding dropped packages, temperature violations, incorrect parcel splits and consolidations. The wireless communications agents log all events (e.g., parcel splits and consolidations).

In some examples, a set of parcels are defined as a group using an encoding system that instructs the wireless communications agents which agent identifiers are members of the group. In some embodiments, the tape agents in the group are programmed to wakeup at scheduled times to ensure that the current grouping of agents is still consistent with the logistics instructions. For example, if there are no group members that have improperly split off from the designated group and there are no additional members that improperly joined the designated group without receiving instructions from the logistics processing system that change the membership in the defined group. In some examples, if there is an unaccounted change in the membership of the defined group, a designated one of the agents will trigger an alarm. For example, as a vehicle is being loaded with a group of parcels, one or more of the wireless communications agents are configured to detect when a parcel in the group has not been loaded on the vehicle and detect when a parcel that is not part of the group has been loaded on the vehicle.

In another example, the logistics system encodes instructions for detecting and responding to potentially damaged items in parcels. For example, if an agent detects acceleration of the parcel above a threshold acceleration level, the agent will signal the logistics system to abort the shipment of the parcel.

Referring back to the embodiment shown in FIG. 5A, one or more of the line-powered wireless communications devices 118, 120, 122 are configured to wirelessly interrogate the flexible adhesive wireless communications tags 106, 108, 110 that are respectively adhered to the assets 100, 102, 104 (e.g., parcels). In an example, the one or more line-powered wireless communications devices 118, 120,

122 broadcast a radio frequency (RF) transmission into the physical premises 98 and receives from the flexible adhesive wireless communications tags 106, 108, 110 the respective identifiers associated with the tags 106, 108, 110, along with other data, such as logistics rules violations stored in the memory of at least one of the flexible adhesive wireless communications tags 106, 108, 110. In some embodiments, the line-powered wireless communications devices 118, 120, 122 also are configured to determine a respective location of each parcel 100, 102, 104 in the physical premises 98 based on the known locations of the line-powered wireless communications devices 118, 120, 122 and the received signal strength indicator (RSSI), which measures the power in the radio signals received by the line-powered wireless communications devices 118, 120, 122 from the flexible adhesive wireless communications tags 106, 108, 110. In this process, the received RSSI power levels correspond to respective distances between the line-powered wireless communications devices 118, 120, 122 and the wireless tags 106, 108, 110 on the parcels 100, 102, 104 in the physical premises environment 98. Other measures of wireless signal strength include, for example, time-of-flight and time-of-arrival measures.

As shown in FIG. 5B, in response to the improper removal of the parcel 102 from the physical premises environment 98, a designated master wireless communications device 122 that is equipped with a speaker issues an audible alarm signal 124. In some examples, the master wireless communications device 122 also wirelessly reports the improper split of the parcel 102 from the designated group of parcels 100, 102, 104 to the logistics system.

Figure 6A:
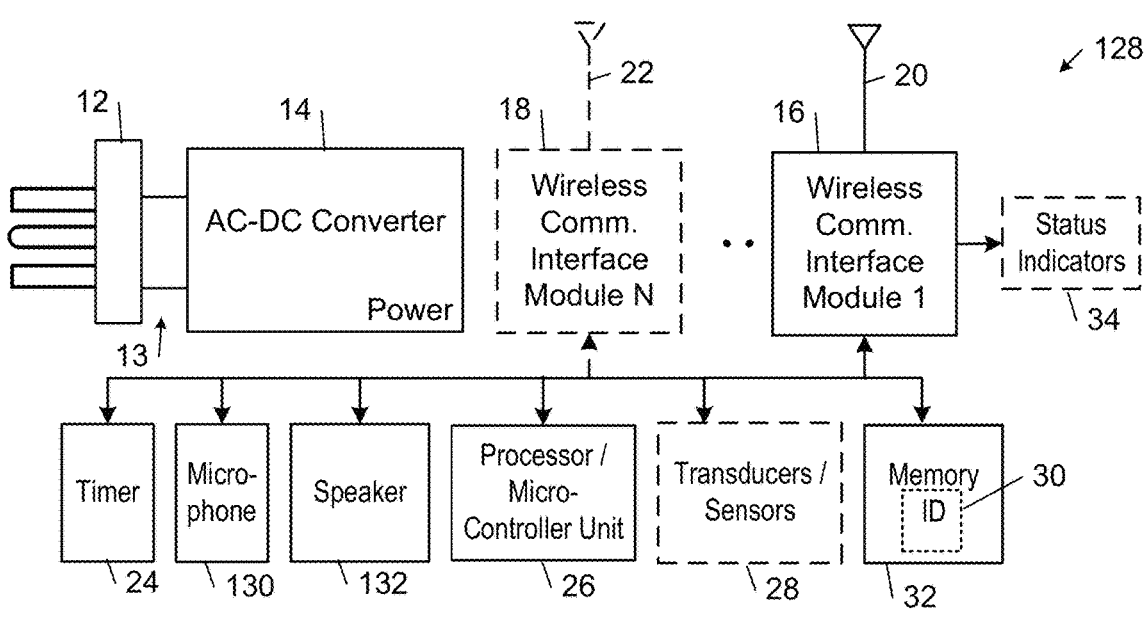
FIG. 6A is a block diagram of an embodiment of a line-powered wireless communications system that includes a microphone and one or more speakers.

FIG. 6A shows a block diagram of an example of a line-powered wireless communications system 128 that includes an integrated microphone 130 and an integrated speaker 132. In some embodiments, the system 128 operates as an intercom device that communicates voice signals between a first person at a first location and a second person at second location.

Figure 6B:
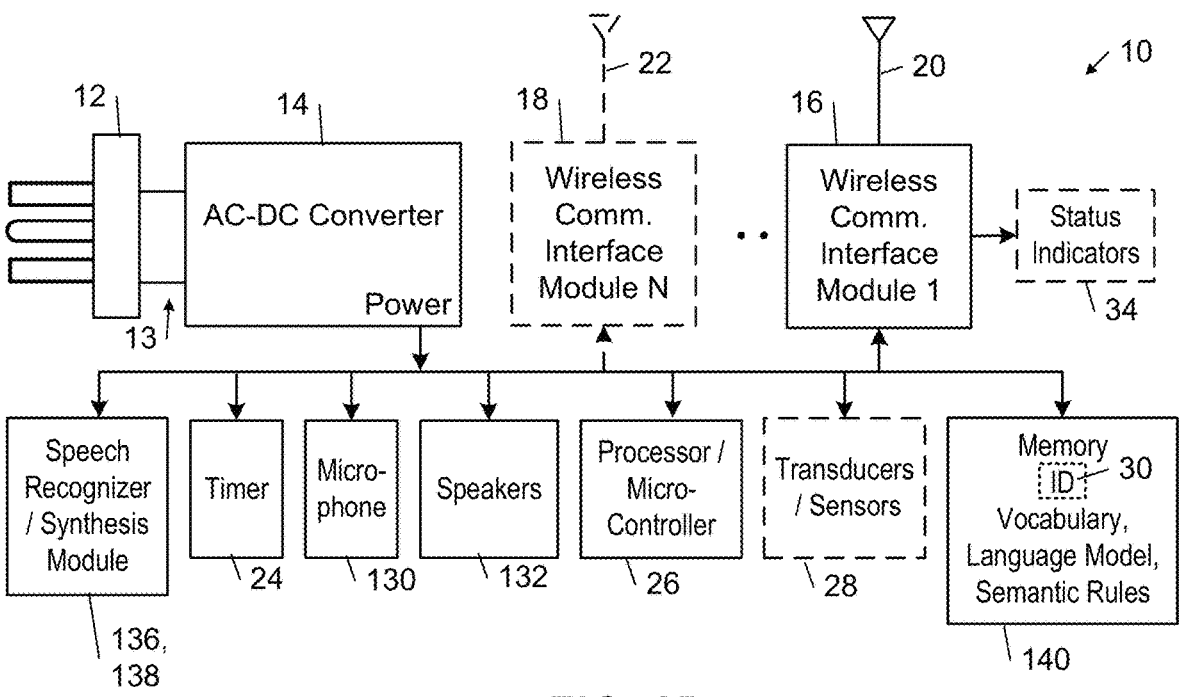
FIG. 6B is a block diagram of an embodiment of a line-powered wireless communications system that is configured to provide virtual assistant functionality.

Alternatively, with reference to FIG. 6B, the intercom device may be connected to an automated virtual assistant that recognizes speech 136 and generates synthesized speech 138 based on data stored in a memory 140, including a vocabulary, a language model, and semantic rules. In some of these examples, the automated virtual assistant also is capable of voice recognition to confirm the identity of the person with whom the automated virtual assistant is speaking. In some examples, the automated assistant is configured to access a wireless tracking system implemented by multiple of the line-powered wireless communications systems to locate a wireless tag carried by a particular person in the physical premises environment, and initiate a wireless call to a line-powered wireless communications system 128 that is nearest to the particular person's current location. The call may concern any of a variety of matters, ranging from high priority matters to low priority matters. In general, the call can relate to the nearest line-powered wireless communications system 128 or a different line-powered wireless communications system, where the network of line-powered wireless communications systems is capable of bridging data between multiple plugs, sockets, or wireless communications devices.

Figure 7A:
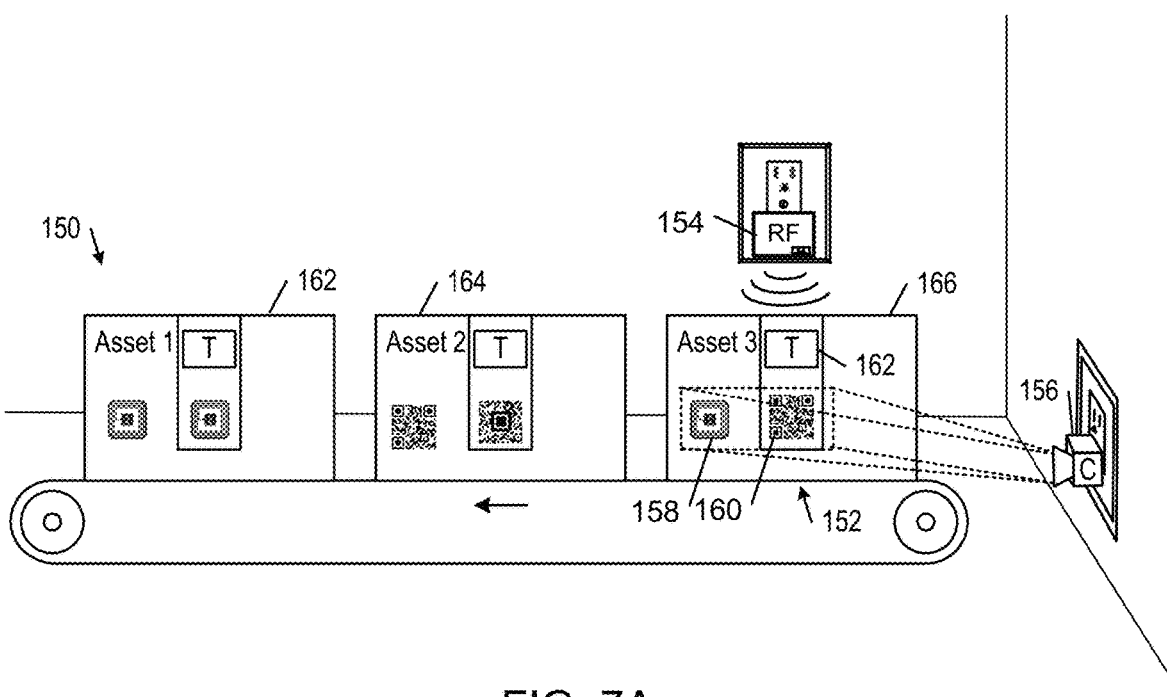
FIGS. 7A-7B are diagrammatic views of different example techniques for reading and correlating asset identifiers.

FIG. 7A shows a conveyor system 150 configured to convey assets through a scanning zone 152 configured with a line-powered wireless communications device integrated with a RF/RFID reader 154 and a line-powered wireless communications device that incorporates an imaging device 156 (e.g., a camera) to implement an automated process for reading and associating asset identifiers. The illustrated embodiment shows the asset 162 ("Asset 1"), the asset 164 ("Asset 2"), and the asset 166 ("Asset 3") being conveyed on, for example, a conveyor belt or on rollers, past the line-powered wireless RF/RFID reader 154 and the imaging device 156 in a first-in, first out (FIFO) order.

The imaging device 156 is configured to capture images of visible features on each asset 166 that includes a RFID tag 158 adhered to the asset 166 and a barcode 160 that is printed on the wireless adhesive product 162. Each of the RFID tag 158 and the barcode 160 stores respective identifiers and potentially other information.

The line-powered wireless RF/RFID reader 154 includes a RFID transceiver that is configured to read data from the RFID tag 158 adhered to the asset 166. The RFID tag 158 may be configured with a respective fixed packet of read-only data (e.g., a respective tag identifier) that can be wirelessly transmitted to the RFID transceiver of the line-powered wireless RF/RFID reader 154. When the line-powered wireless RF/RFID reader 154 is moved within range of the RFID tag 158 and communicates in the same radio-frequency range as the RFID tag, the line-powered wireless RF/RFID reader 154 may read the respective identifier and other data from the RFID tag contemporaneously or consecutively The imaging device 156 is configured to capture a respective image of the barcode 160. In some examples, the imaging device 156 also includes processing circuitry and executable instructions to read the barcode 160. In some of these examples, the imaging device 156 is operable to transmit the captured barcode image to a network service to be decoded. In still other examples, the imaging device 156 is operable to communicate wirelessly with the line-powered wireless RF/RFID reader 154, store the captured barcode image in the memory component of the line-powered wireless RF/RFID reader 154, and transmit the captured barcode image or the decoded barcode data to the network service. In these examples, either the imaging device 156 or the line-powered wireless RF/RFID reader 154 may transmit the image data or the decoded image data to the network service.

Figure 7B:
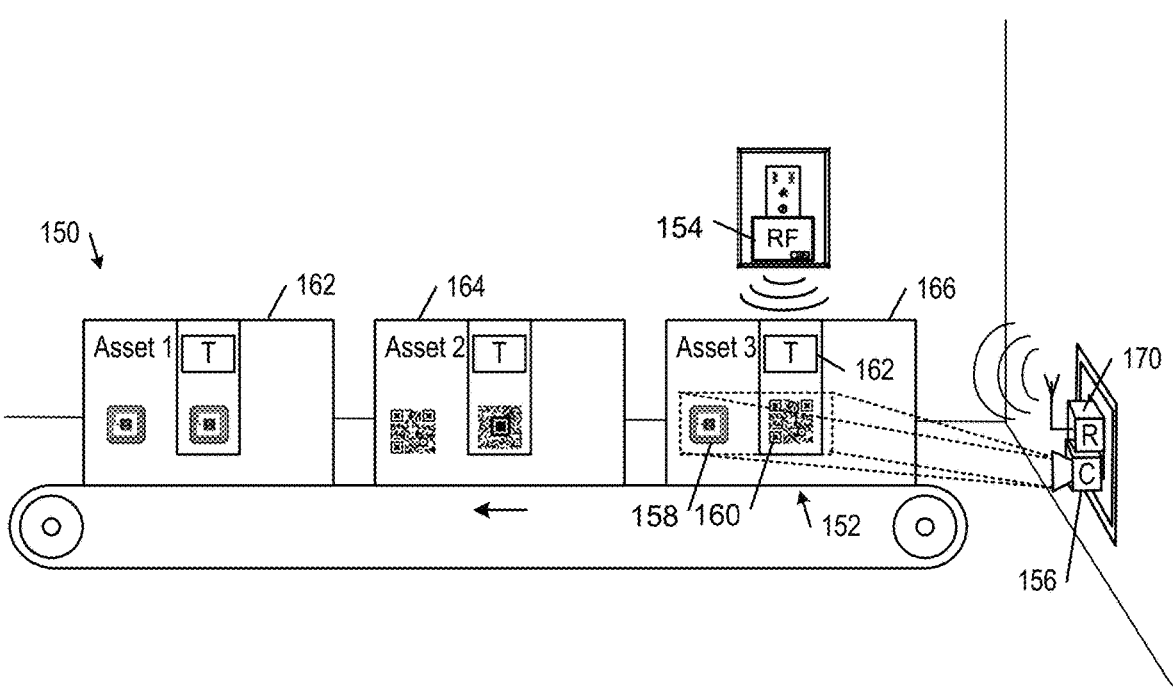

Referring to FIG. 7B, in some examples, instead of integrating the wireless RF transmitter with the RFID transceiver in the embodiment shown in FIG. 7A, the RFID transceiver is integrated into its own line-powered wireless device 170. The integrated device is capable of reading data from the RFID tag 158 and optionally writing data to the RFID tag 158.

In some examples, the network service is configured to create an association between the RFID tag 158 and the barcode 160 predicated on the tags satisfying a temporal or spatial proximity condition with respect to the asset 166, as explained herein. In an example, the spatial proximity condition is satisfied in response to a determination that the imaging device 156 captured the RFID tag 158 and the barcode 160 on the asset 166 in a single image. Based on a determination that the proximity condition is satisfied, the network service may store the association between the RFID tag 158 and the barcode 166 in a database or in the memory of the wireless adhesive product 162 adhered to the asset 166. In some examples, during manufacture of the wireless adhesive product 162, the network service stores an association between the identifier of the barcode 160 and the identifier of the RFID tag 158 in a database or in the memory of the wireless adhesive product 162. In some examples, the imaging device 156 also is configured to wirelessly communicate with the wireless adhesive product 162 and read the identifiers stored in the memory component of the wireless adhesive product 162.

Figure 8C:
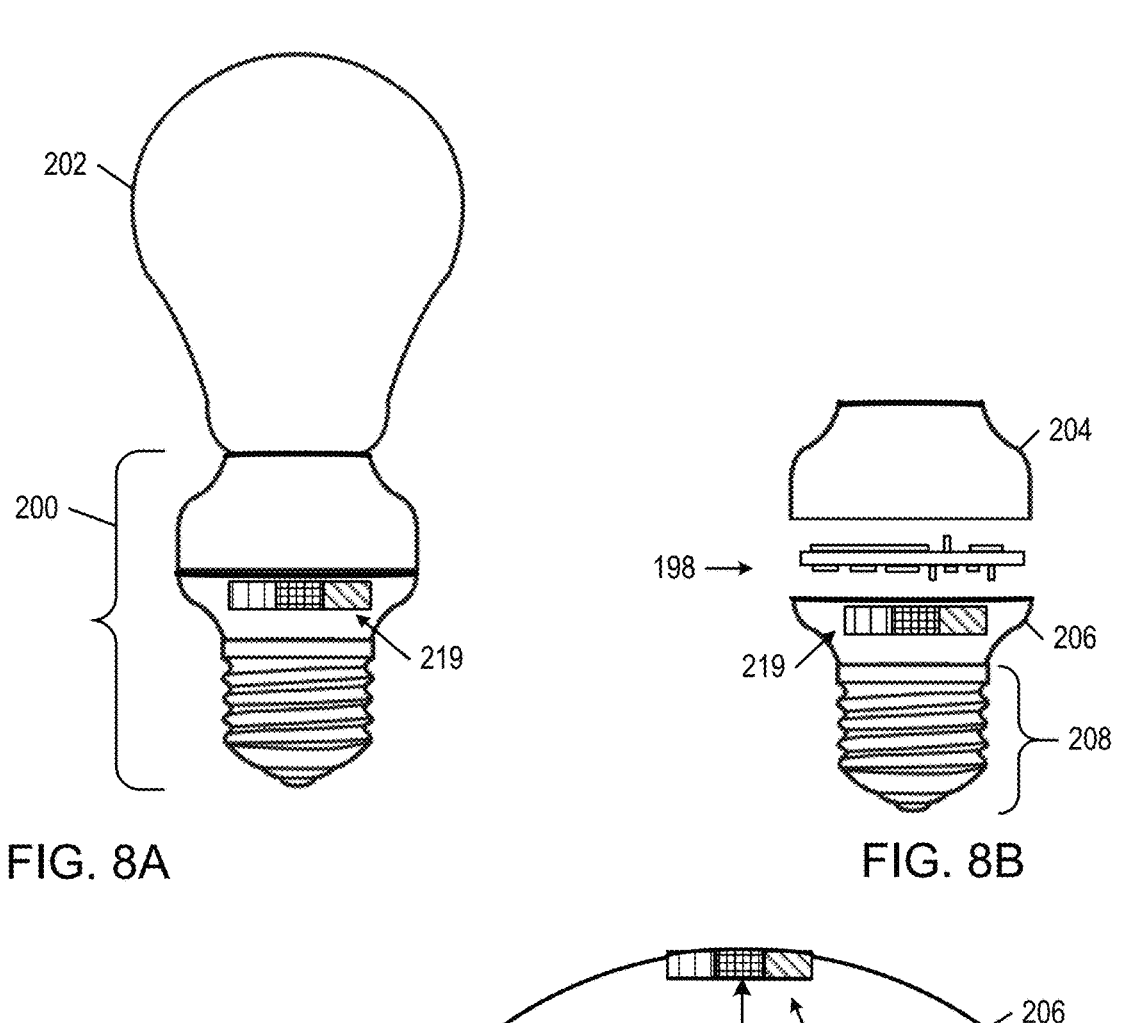
FIG. 8C is a diagrammatic view of the example line-powered wireless communications system of FIG. 8B.
Figure 8C:
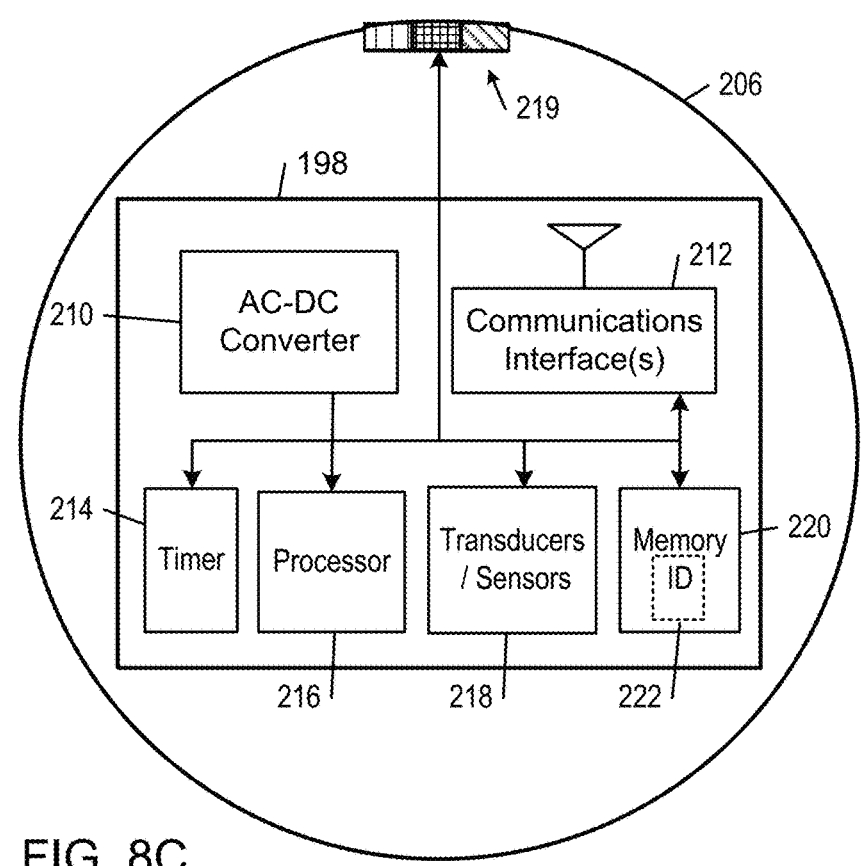

FIGS. 8A-8C show an embodiment of a line-powered wireless communications system 198 integrated into a socket adapter 200 for a light bulb 202. The socket adapter 200 includes an upper portion 204 and a lower portion 206. The upper portion 204 of the socket adapter 200 defines a recess with a threaded socket that accommodates the threaded base end of the light bulb 202. Embodiments of the line-powered wireless communications system 198 typically are secured at the top end of the lower portion 206 of the socket adapter 200. Referring to FIG. 8C, embodiments of the line-powered wireless communications system 198 may be implemented on one or more printed circuit boards that include a variety of electrical components, including an AC-DC converter 210, a communications interface 212, a timer 214, a processor 216, one or more transducers or sensors 218, a surge protection circuit, a timing control circuit, status lights 219, and a memory 220 that stores a universally unique identifier 222 for the wireless communications system. The bottom end 208 of the lower portion 206 of the socket adapter is configured to screw into a threaded socket fixture.

The line-powered wireless communications system 198 may communicate wirelessly with other wireless devices or system using any of a wide variety of communications interfaces, including but not limited to, for example, a Bluetooth® Low Energy (BLE) communications interface, a Zigbee communications interface, a Z-Wave communications interface, a LoRaWAN communications interface, a Wi-Fi communications interface, and a cellular communications interface.

Figure 9:
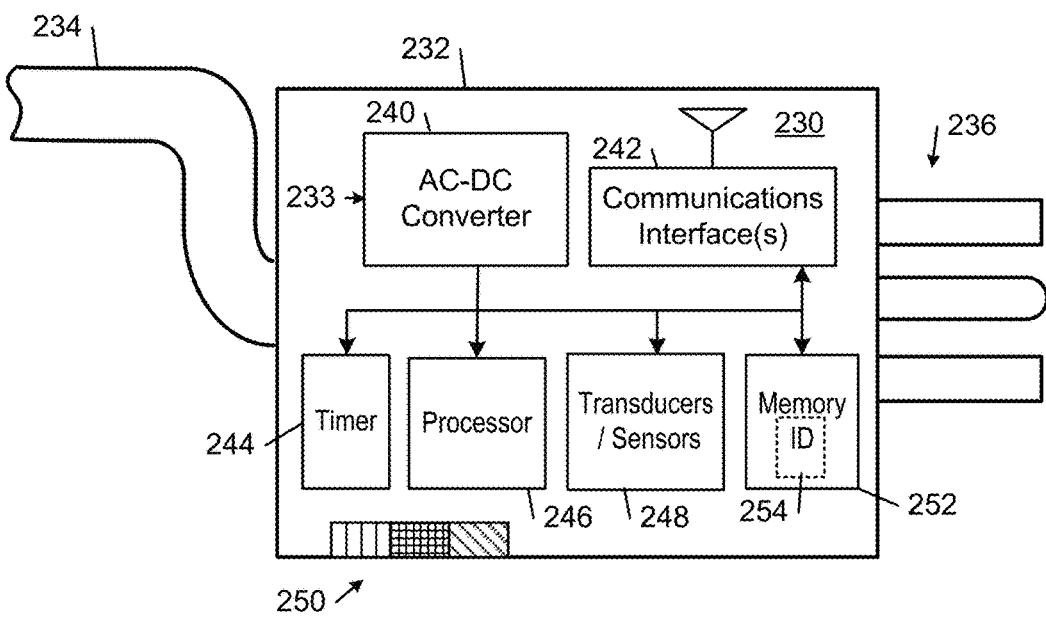
FIG. 9 is a diagrammatic view of a power cord and a plug that incorporates an example line-powered wireless communications system.

FIG. 9 shows an embodiment of a line-powered wireless communications system 230 integrated into a plug 232 of an electrical cable 234. In the illustrated embodiment, the electrical cable plug 232 has a three-prong configuration 236. In other embodiments, the electrical cable plug 232 may have any of a wide variety of plug styles, including a two-prong configuration of live and neutral prongs. In the illustrated example, the prongs of the electrical cable plug 232 can be plugged into an electrical outlet or socket to carry an alternating current over live and neutral connections (not shown) to the input 233 of an alternating current/direct current (AC/DC) converter 14, which supplies direct current to power the other electrical components of the wireless communications system 10.

Embodiments of the line-powered wireless communications system 230 may be implemented on one or more printed circuit boards that include a variety of electrical components, including an AC-DC converter 240, a communications interface 242, a timer 244, a processor 246, one or more transducers or sensors 248, a surge protection circuit, a timing control circuit, status lights 250, and a memory 252 that stores a universally unique identifier 254 for the wireless communications system 230.

The line-power wireless communications system 230 may communicate wirelessly with other wireless devices or system using any of a wide variety of communications interfaces, including but not limited to, for example, a Bluetooth® Low Energy (BLE) communications interface, a Zigbee communications interface, a Z-Wave communications interface, a LoRaWAN communications interface, a Wi-Fi communications interface, and a cellular communications interface.

Figure 10:
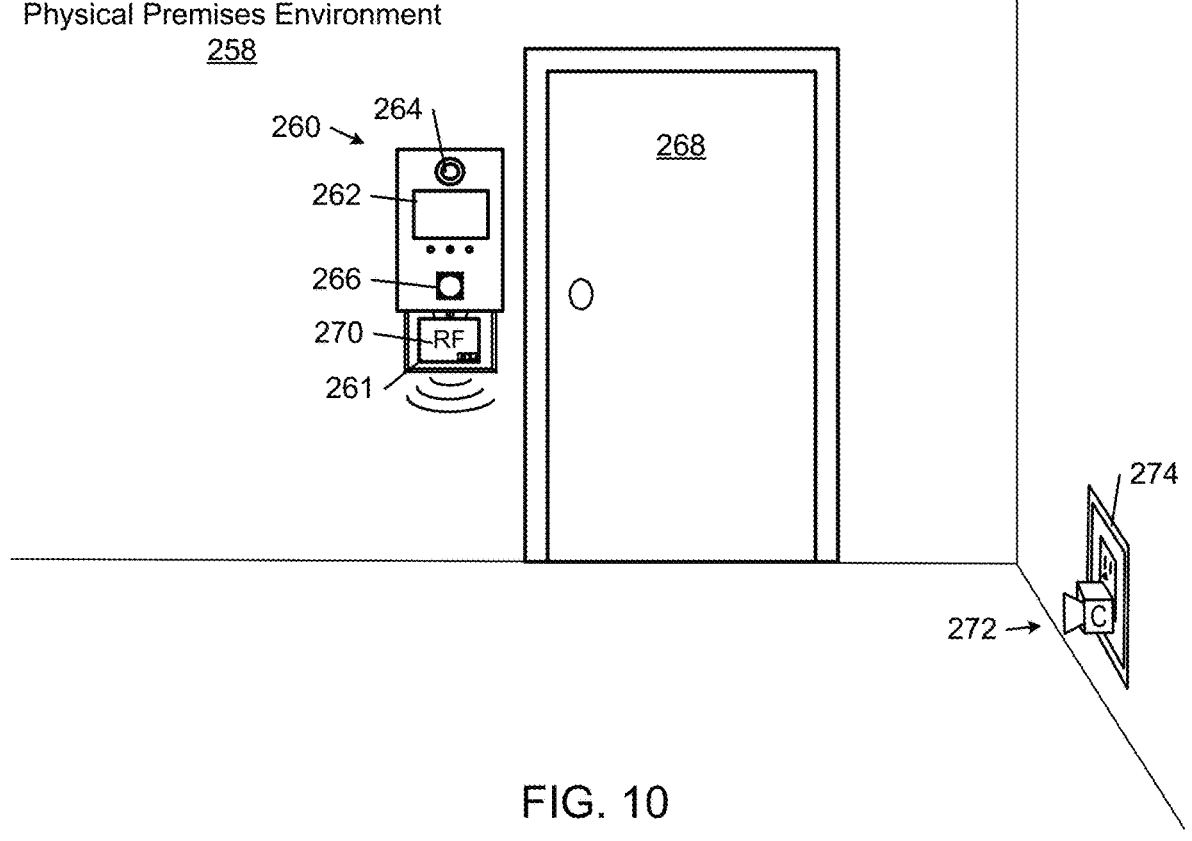
FIG. 10 is a diagrammatic view of an example physical premises environment that includes an intercom equipped with a touchscreen display, a camera, and a fingerprint sensor for controlling a security door.
Figures 11A, 11B, 11C:
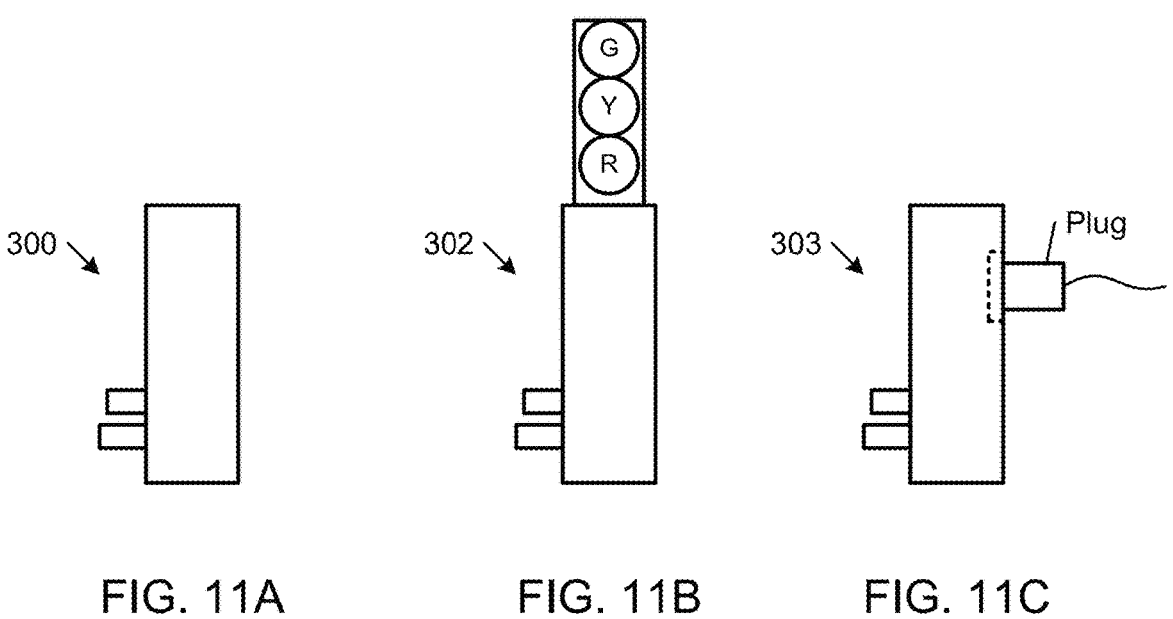
FIGS. 11A-11Y show different form factors in which line-powered wireless communications systems are incorporated.
Figures 11D, 11E, 11F:
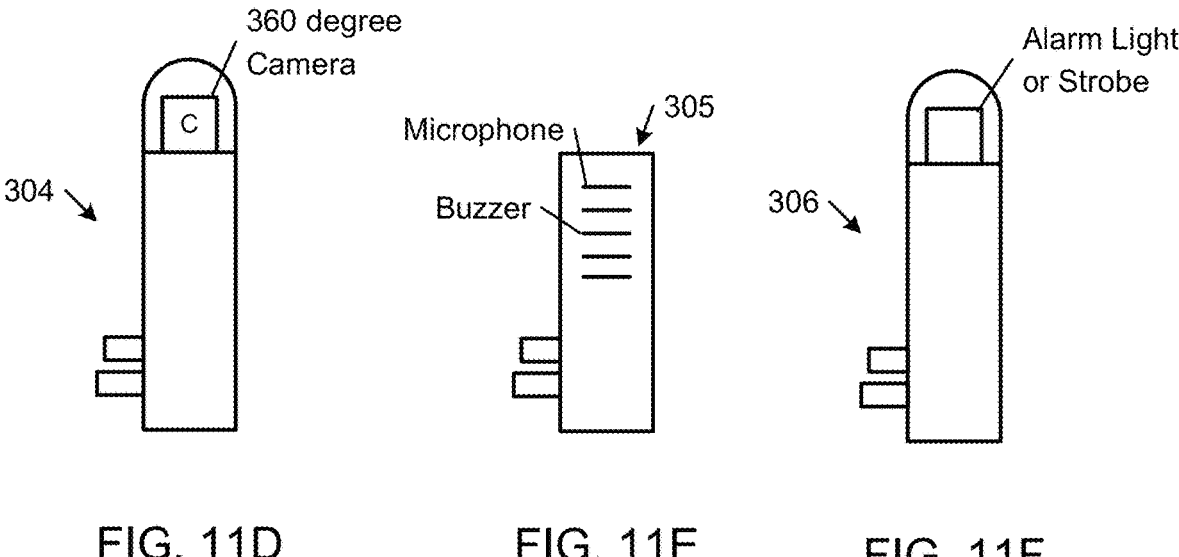
Figures 11G, 11H, 11I:
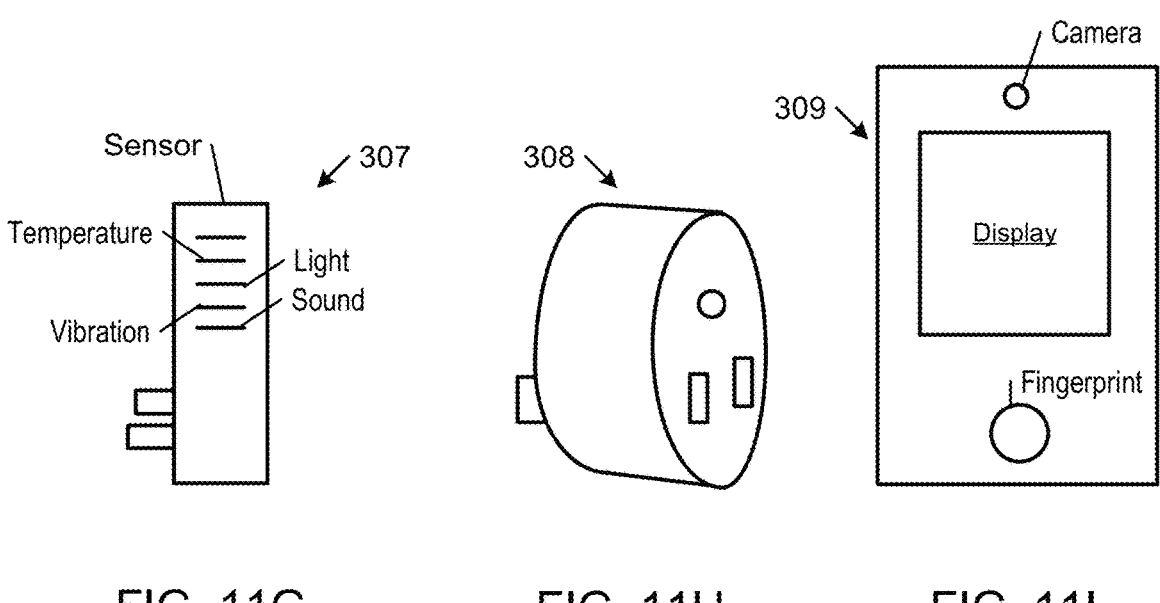
Figure 11J:
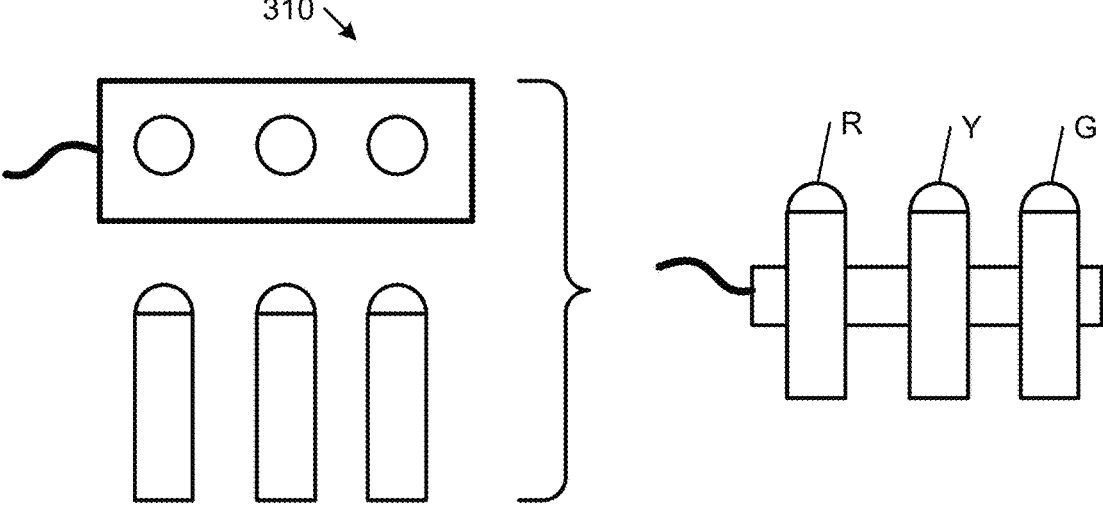
Figures 11K, 11L:
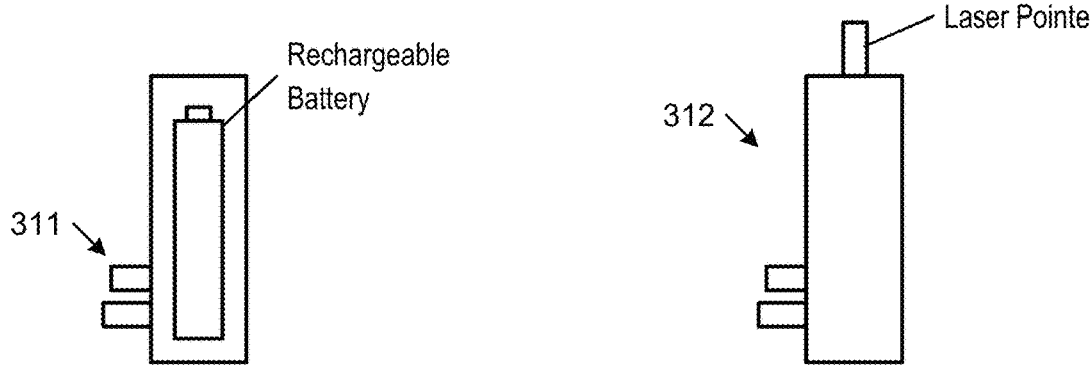
Figure 11M:
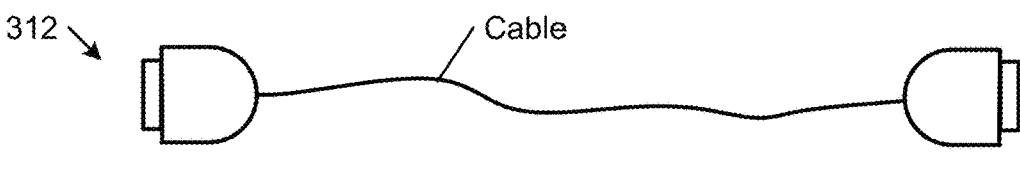
Figure 11N:
Figure 11O:
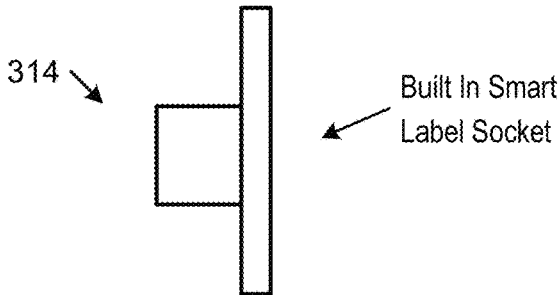
Figure 11P:
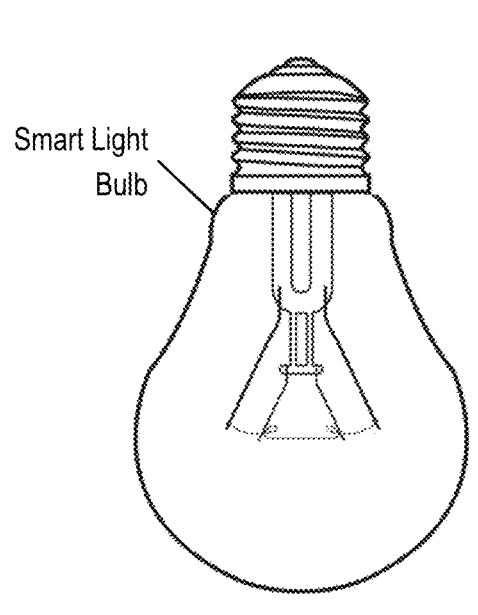
Figure 11Q:
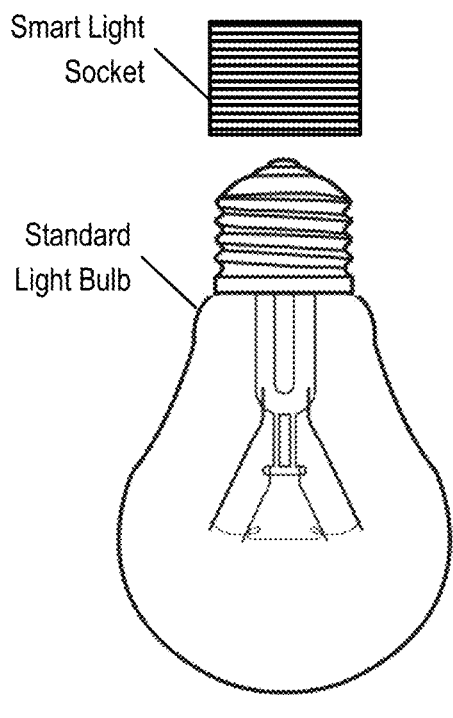
Figure 11R:
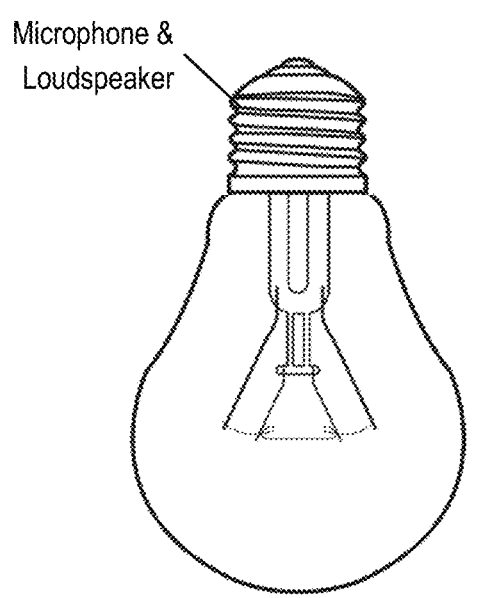
Figure 11S:
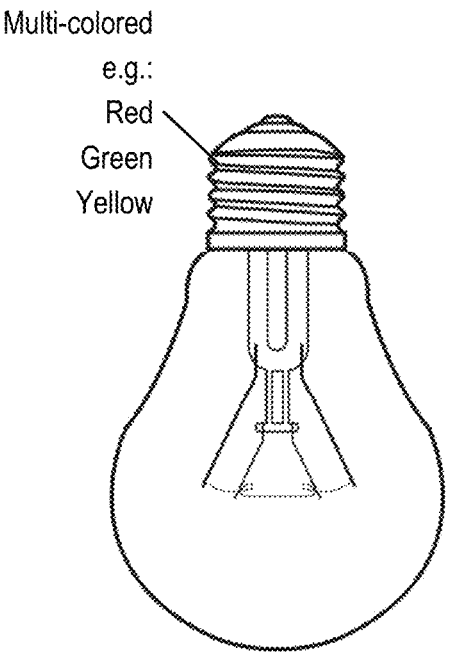
Figures 11T, 11U, 11V, 11W, 11X, 11Y:
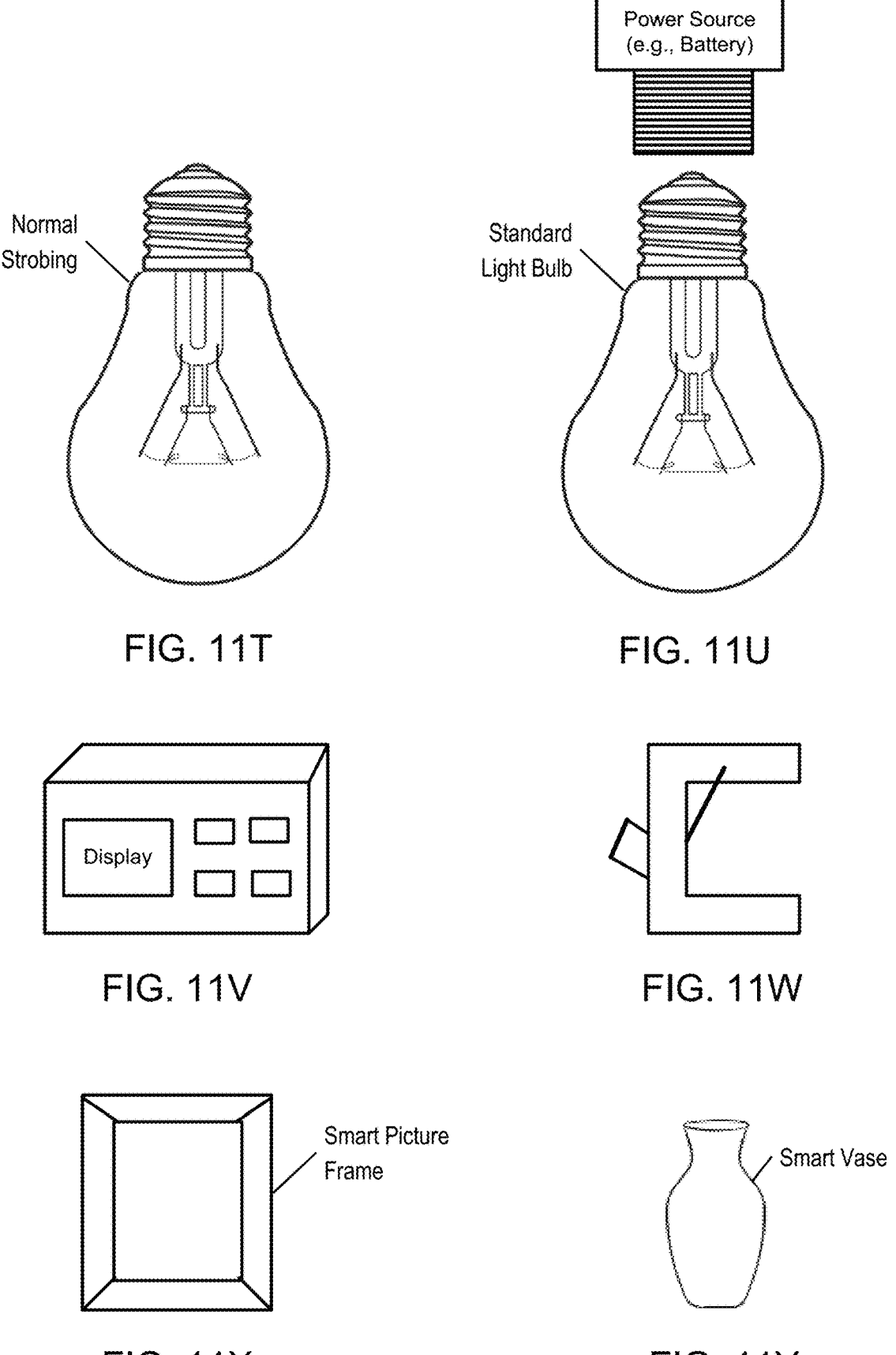

FIG. 10 shows an example physical premises environment 258 that includes a line-powered security intercom 260 that is plugged into a top socket of an electrical power outlet

261. The security intercom 260 is equipped with a touchscreen display 262, a camera 264, and a fingerprint sensor 266 that controls access to an area of the physical premises environment behind a security door 268. The touch screen display 262 enables a user to input or control the security intercom 260. In some examples, the camera 264 is used to identify the user based on facial recognition. The fingerprint sensor 266 is used to identify the user based on the user's fingerprint. The physical premises environment 258 also includes an RFID tag reader 270 that is plugged into a bottom socket of the electrical power outlet 261, and a camera module 272 with a 180 degree view integrated with a line-powered wireless communications system that is plugged into a bottom socket of an electrical power outlet 274.

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

ADDITIONAL DISCLOSURE

1. Integration of black/green/white tape into wall plug form factor without the need for a power supply wire
    1.1. The electrical connection becomes the mechanical connection to hold the system into place
    1.2. The system integrates multi-radio platform, GPS, various sensors
        1.2.1. The system combines multiple plugs to work together to fulfill overall system objectives related to an IOT deployment
            1.2.1.1. System where asset tracking is the specific purpose
            1.2.1.2. System where preventative maintenance is the specific purpose
2. System as in (1) where alarm lights are integrated into the plug
    2.1. System with red, yellow, green light to identify system status
    2.2. Signal can either relate to the specific plug, another plug, or a system feature that bridges data from multiple plugs and/or data sources 3. System as in (2) where there is a socket inside the plug 3.1. System where the socket is always on so the user is not giving up a wall socket when using the system 3.2. System where the socket is controlled by the plug 3.2.1. The control can either be for the specific plug, another plug, or a system feature that bridges data from multiple plug and/or data sources 3.3. System used to control a conveyer belt, door, light source, alarm signal, machine, or any other power controlled system 4. System as in (1) where there is a microphone and loudspeaker integrated into the system 4.1. System where the microphone and loudspeaker functions as a virtual assistant integrating voice recognition as well as voice synthesis 4.2. Signal can either relate to the specific plug, another plug, or a system feature that bridges data from multiple plugs and/or data sources 5. System as in (1) where there is a large alarm light mounted on top of the plug 6. System as in (2) where the design is miniaturized and can be used without people noticing it 7. System as in (1) where a camera, display and/or finger print sensor is integrated 7.1. Camera used for face detection 7.2. Display can be touch screen 8. System as in (1) where multiple plugs are plugged together in a wall socket and work together to fulfill a system function 8.1. System where one plug represents red, one plug represents yellow, and one plug represents green 9. System as in (1) integrates a battery in case the wall socket power temporary is unavailable 9.1.1. System where the battery is rechargeable 10. System as in (1) that integrates a laser point or projection system 11. System as in (1) but made invisible thru integration into an ordinary extension cord 12. System as in (1) but made invisible thru integration into an ordinary extension cord with fan out 13. System as in (1) but integrated into a build in wall socket (mounted inside the wall)

14. System as in (1) with numerous sensors such as temperature, pressure, GPS, sound, vibration 15. System as in (1) where the plug communicates with one or more remote tiny systems 16. System as in (1) where wireless power is integrated so that the plug enables wireless charging of other subsystem 17. System as in (1) where it also integrates an RFID reader 18. System as in (1) where a camera is integrated 18.1. System where the camera has a 180 degree field of view 19. Integration of black/green/white tape into light bulb without the need for a power supply wire 19.1. The electrical connection becomes the mechanical connection to hold the system into place 19.2. The system integrates multi-radio platform, GPS, various sensors 19.2.1. The system combines multiple plugs to work together to fulfill overall system objectives related to an IOT deployment 19.2.1.1. System where asset tracking is the specific purpose 19.2.1.2. System where preventative maintenance is the specific purpose 19.3. Light bulbs are placed in a regular grid 19.4. Light bulbs are placed in regular lanterns along a road 19.5. Smart light bulb that integrates a microphone and loud speaker 19.5.1. Smart light bulb that represents a virtual assistant 19.6. The light can change in color to signal certain information about the current system status 20. Integration of 19 into a tile that can be used in the ceiling 21. An interposer that fits a light fixture from both sides so it can be hidden and a normal light bulb can be used 22. The light can strobe to signal certain information about the current system status 23. A fully integrated dashboard with buttons and displays that is battery powered and can be mounted to the wall thru adhesive materials 24. Smart switch frame that can be put around a switch so that the system can be used to toggle a switch 24.1. The system is part of a system with multiple nodes and the decision to toggle depends on various data sources 24.2. The system that works with push switches, dimmers, toggle switches 24.3. Integration of multi radio platform, GPS and various sensor 25. System as in (24) where the design is built into the wall (where the switch is still accessible)

25.1. System as in 25 where the switch retains to have the normal role it had before 26. System as in 25 where the meaning of switching now changed dependent on the overall system objectives 27. System as in 1 but integrated into a picture frame 28. System as in 1 but integrated into a vase 29. System as in 1 but integrated into a fire extinguisher 30. System as in 1 with curved design and integrated lights 31. Other embodiments are within the scope of the claims.

The invention claimed is:

1. A system comprising:

a first wireless communication device in proximity to a conveyer belt conveying a plurality of assets through a first zone, the first wireless communication device comprising:

a camera, and a wireless communication interface of a first type coupled to an antenna, the first wireless communication device configured to capture images of the plurality of assets a second wireless communication device in proximity to the conveyer belt, the second wireless communication device comprising:

an integrated RFID reader, and a wireless communication interface of the first type coupled to an antenna, a processor, and a memory, the second wireless communication device configured to communicate with the first wireless communication device using the wireless communication interface of the first type and to read data from one or more RFID tags using the integrated RFID reader, wherein the one or more RFID tags are attached to one or more assets of the plurality of assets.

2. The system of claim 1, further comprising a plurality of wireless adhesive products, each wireless adhesive product attached to a respective asset of the plurality of assets and comprising:

a processor;

a wireless communication interface coupled to an antenna, a battery; and a memory.

3. The system of claim 2, wherein each wireless adhesive product is configured to store: an RFID identifier of an RFID tag attached to a respective asset, a barcode identifier decoded from a barcode displayed on a visible feature of the respective asset, and an association between the RFID identifier and the barcode identifier.

4. The system of claim 3, wherein the barcode is printed on the wireless adhesive product.

5. The system of claim 1, wherein a barcode is visible in each of the images of the plurality of assets.

6. The system of claim 1, wherein the first wireless communication device sends a first image of a first asset to a network service.

7. The system of claim 6, wherein the second wireless communication device sends RFID data to the network service.

8. The system of claim 7, wherein the network service associates the RFID data with a barcode decoded from a barcode visible in the first image.

9. A method comprising:

receiving RFID data from a first wireless communication device, the RFID data read from an RFID tag on an asset being conveyed through a first zone;

receiving an image of a barcode from a second wireless communication device, the barcode displayed on a wireless adhesive product attached to the asset;

decoding a barcode identifier from the image of the barcode;

associating the RFID data with the barcode identifier; and storing the association between the barcode identifier and the RFID data on a memory of the wireless adhesive product.

10. The method of claim 9, further comprising:

prior to associating the RFID data with the barcode identifier, determining that the RFID tag and the asset satisfy a proximity condition.

11. The method of claim 10, wherein the proximity condition comprises the RFID tag being visible in the image of the barcode.

12. The method of claim 9, further comprising:

reading one or more identifiers stored in the memory of the wireless adhesive product.

13. The method of claim 9, wherein the wireless adhesive product further comprises:

a wireless communication interface coupled to an antenna;

a processor; and a battery.

14. A method comprising:

receiving, by a first wireless communication device, barcode data decoded from an image of a barcode displayed on a visible feature of an asset using a wireless communication interface of a first type coupled to an antenna, the asset being conveyed through a first zone by a conveyer belt;

reading, by the first wireless communication device, RFID data from an RFID tag using an RFID reader integrated with the first wireless communication device;

sending, by the first wireless communication device, the barcode data and the RFID data to a network service using a wireless communication interface coupled to an antenna of the first wireless communication device, wherein the barcode data is sent from a second wireless communication device comprising: a wireless communication interface of the first type coupled to an antenna and a camera used to capture the image, the barcode data comprises a barcode identifier, and the RFID data comprises an RFID identifier.

15. The method of claim 14, wherein the network service associates the RFID identifier with the barcode identifier and stores the association in a database.

16. The method of claim 14, wherein the network service associates the RFID identifier with the barcode identifier and stores the association in a database in response to determining that a proximity condition between the RFID tag and the asset is satisfied.

17. The method of claim 16, wherein the proximity condition comprises a temporal proximity condition.

18. The method of claim 17, wherein the proximity condition comprises determining that the RFID tag is visible in the image of the barcode.

19. The method of claim 14, further comprising storing the barcode data on a memory of the first wireless communication device.

20. The method of claim 14, wherein an association between the barcode identifier and the RFID identifier is stored on a memory of a wireless adhesive product attached to the asset.

* * * * *